(12) United States Patent
Goutelard (10) Patent No.: US 9,885,783 B2
(45) Date of Patent: Feb. 6, 2018

(54) METHODS AND SYSTEMS FOR ENCODED BROADCASTING AND ANTENNA RECEPTION, PARTICULARLY FOR RADAR

(75) Inventor: Claude Goutelard, Bretigny sur Orge (FR)

(73) Assignee: ANTHEOP, Trets (FR)

( * ) Notice: Subject to any disclaimer, the term of this patent is extended or adjusted under 35 U.S.C. 154(b) by 71 days.

(21) Appl. No.: 13/001,763

(22) PCT Filed: Jun. 30, 2009

(86) PCT No.: PCT/EP2009/058189
§ 371 (c)(1),
(2), (4) Date: Dec. 28, 2010

(87) PCT Pub. No.: WO2010/000742
PCT Pub. Date: Jan. 7, 2010

(65) Prior Publication Data
US 2011/0109498 A1     May 12, 2011

(30) Foreign Application Priority Data
Jul. 3, 2008   (FR) ..................................... 08 54537

(51) Int. Cl.
*G01S 13/00* (2006.01)
*G01S 13/28* (2006.01)
*G01S 13/48* (2006.01)

(52) U.S. Cl.
CPC .......... *G01S 13/003* (2013.01); *G01S 13/284* (2013.01); *G01S 13/48* (2013.01)

(58) Field of Classification Search
CPC ....... G01S 13/003; G01S 13/48; G01S 13/284
(Continued)

(56) References Cited

U.S. PATENT DOCUMENTS 3,273,144 A    9/1966  Fishbein
5,313,210 A *  5/1994  Gail ............................ 342/25 A
(Continued)

FOREIGN PATENT DOCUMENTS

GB       1 405 241       9/1975
WO    2007/124460 A1    11/2007

OTHER PUBLICATIONS

Written Opinion of the International Searching Authority (ISA/EP) for International Application No. PCT/EP2009/058189, opinion completed Oct. 6, 2009.
(Continued)

*Primary Examiner* — Matthew M Barker
(74) *Attorney, Agent, or Firm* — Klein, O'Neill & Singh, LLP (57) ABSTRACT

To reduce radar cells and to improve the detection of a radar system, particularly a high-frequency surface wave radar (HFSWR), the broadcast system (SEM) is capable of broadcasting basic orthogonal signals two by two and each orthogonal to itself, temporally shifted to form, respectively, broadcast radiation patterns, each including main radiation lobes ($LP_1$, $LP_N$) alternating with secondary lobes, the main lobes associated with the basic signals being substantially juxtaposed in space. The receiving system (SRE) is capable of forming as many reception patterns in a monitored receiving area (ZR) as cells ($CES_{n',m}$) contained in the receiving area that are covered by main radiation lobes ($LP_n$) from one of the broadcast radiation patterns and located at a bistatic distance from the broadcast and receiving systems.

12 Claims, 5 Drawing Sheets

(58) Field of Classification Search
USPC .......................................................... 342/146
See application file for complete search history.

(56) References Cited

U.S. PATENT DOCUMENTS

| | | | | |
|---|---|---|---|---|
| 5,793,798 | A * | 8/1998 | Rudish | G01S 7/023 |
| | | | | 375/130 |
| 5,867,118 | A * | 2/1999 | McCoy et al. | 342/90 |
| 6,031,485 | A | 2/2000 | Cellai et al. | |
| 6,243,037 | B1 * | 6/2001 | Pulford et al. | 342/95 |
| 6,359,584 | B1 * | 3/2002 | Cordey et al. | 342/169 |
| 6,456,229 | B2 * | 9/2002 | Wurman et al. | 342/59 |
| 6,774,837 | B2 * | 8/2004 | Barrick et al. | 342/26 R |
| 6,922,145 | B2 | 7/2005 | Piesinger | |
| 7,038,618 | B2 * | 5/2006 | Budic | 342/195 |
| 7,183,969 | B2 * | 2/2007 | Pozgay et al. | 342/174 |
| 7,345,625 | B1 * | 3/2008 | Urkowitz | 342/174 |
| 7,369,083 | B2 * | 5/2008 | Budic | G01S 7/414 |
| | | | | 342/125 |
| 7,479,918 | B2 * | 1/2009 | Johnson et al. | 342/22 |
| 7,557,747 | B1 * | 7/2009 | Smith et al. | 342/74 |
| 7,800,527 | B2 * | 9/2010 | Douglass et al. | 342/22 |
| 8,077,074 | B2 * | 12/2011 | Venkatachalam et al. | 342/59 |
| 8,120,526 | B2 * | 2/2012 | Holder | G01S 13/003 |
| | | | | 342/139 |
| 2003/0071751 | A1 * | 4/2003 | Barrick et al. | 342/104 |
| 2008/0143587 | A1 * | 6/2008 | Johnson | G01S 7/411 |
| | | | | 342/25 R |
| 2008/0158061 | A1 * | 7/2008 | Greverie et al. | 342/453 |

OTHER PUBLICATIONS

Goutelard, C. (1992) "Fractal Theory for Large Lacunar Antenna Rays," AGARD Conference Proceedings 528, Radiolocation Techniques, Londres.

Goutelard, C. (1996) "Les Sequences GQ Sequences Q-aire Orthogonales a Correlation Parfaite," AGARD Conference Proceedings 574, Digital Communications Systems: Propagation Effects, Technical Solutions, Systems Design, Athens.

* cited by examiner

METHODS AND SYSTEMS FOR ENCODED BROADCASTING AND ANTENNA RECEPTION, PARTICULARLY FOR RADAR

CROSS-REFERENCE TO RELATED APPLICATIONS

This application is a §371 national stage entry of International Application No. PCT/EP2009/058189, filed Jun. 30, 2009, which claims priority to French Patent Application No. 0854537, filed Jul. 3, 2008, the entire contents of which are incorporated herein by reference.

FIELD OF THE INVENTION

The present invention generally relates to antenna emission and reception methods and systems for remote sensing systems, including for radar. More particularly, it relates to beyond-the-horizon detection by surface waves and using the combination of properties of antenna systems and signal coding having orthogonality properties.

BACKGROUND OF THE INVENTION

Such a method finds an application in detecting targets beyond the horizon by surface wave radar systems of the HFSWR ("High Frequency Surface Wave Radar") type. Such a HFWSR radar system is essentially limited by the jumble due to the earth surface, more specifically upon detecting ships for which the useful echo is located, within the Doppler-distance space, in the sea jumble, referred to by specialists as "sea spectrum". The jumble, whether due to the sea (sea spectrum) or to any other cause will be referred to herein as jumble. The echoes of targets are often masked by the jumble having its magnitude in direct relation with the dimension of the radar cell defined by the geometrical dimensions of the volume wherein the radar waves able to be broadcast could, at a given time, take part in forming the signal as received by the radar system.

Taking into account the material possibilities for building the HFSWR radar systems, the radar cells remain, in the prior art, too large for reaching the objectives desired by the users. In order to reach such objectives, it is necessary to reduce the dimensions of such cells by a factor ranging from a few tens to a few hundreds.

In order to reduce the dimensions of the radar resolution cell, the prior art leads to increasing the dimensions of the reception antenna systems, being the bulkiest, when this is possible, leading to geometrically extended systems and to using a large number of antennas. The limitations of such an extension result from several factors being able to separately or simultaneously interfere and making up the drawbacks of the prior art: the footprint, the dimensions of the carrier in mobile systems, the consistency of the wave front at the reception site, the complexity of processes relating to the number of antennas.

SUMMARY OF THE INVENTION

This invention aims at overcoming the above mentioned drawbacks and more particularly, at reducing the dimensions of radar resolution cells by a factor able to vary from about 50 to about 500 so as to improve the sensing abilities of radar systems without requiring from the reception antenna system large dimensions.

To this end, a method according to this invention for emitting basic signals having orthogonality properties by emission antennas in an emission system and for receiving basic signals by several reception antennas in a reception system, is characterized in that it comprises the following steps:

forming emission radiation charts for emitting respectively basic signals for all the emission antennas, each emission radiation chart being associated with a respective basic signal to be emitted by all the emission antennas and comprising main radiation lobes alternating with secondary radiation lobes, the main radiation lobes of the emission radiation charts being substantially alternated and juxtaposed in the space, and forming reception radiation charts in a reception area so as to receive the basic signals for each of the reception antennas, the number of radiation charts being at least equal to the number of cells being contained in the reception area, that is covered by the main radiation lobes of one of the emission radiation charts and being located at a given bistatic distance from the emission and reception systems.

This invention further relates to emission and reception systems comprising several emission antennas for emitting basic signals having orthogonality properties and several reception antennas for receiving the basic signals. The emission system is characterized in that it comprises means for forming emission radiation charts for emitting respectively the basic signals for all the emission antennas, each emission radiation chart being associated with a respective basic signal to be emitted by all the emission antennas and comprising main radiation lobes alternating with secondary radiation lobes, the main radiation lobes of the emission radiation charts substantially alternating and being juxtaposed in the space. The reception system is characterized in that it comprises means for forming reception radiation charts in a reception area so as to receive the basic signals for each of the reception antennas, the number of the reception radiation charts being at least equal to the number of cells being contained in the reception area, that are covered by the main radiation lobes of one of the emission radiation charts and being located at a given bistatic distance from the emission and reception systems.

This invention finds application in radar techniques in general, as well as in channel probing, sonar sensing systems, radio-localization systems or radiography of organs in medical applications or of structures in industrial applications. All the above mentioned applications rely on the analysis of space cells, the dimensions of which are to be reduced in order to increase the performance thereof.

The antenna emission system is able to produce a radio-electric radiation characterized, for example, in a predetermined plane, for example an horizontal one passing through the emission system and the reception system, by surface density maximums of radiated energy being substantially juxtaposed according to a predetermined distribution in the predetermined plane so as to cover a monitored reception area that could cover either partially or totally the predetermined plane. The maximums correspond to the main radiation lobes associated with the radio-electric basic signals. For each basic signal, the radiated energy maximums are contained in conical angular sectors, the apex of which is the emission site and being evenly and periodically distributed in the space. The energy maximums of the basic signal are separated by conical angular sectors of minimum radiation corresponding to the secondary radiation lobes where the energy surface density is much lower than that existing in the conical angular sectors where the energy density maximums are located, corresponding to the main radiation lobes. The radiation chart associated with a basic signal in the predetermined plane is referred to as "laminated chart".

The antenna emission system could produce two or more different laminated radiation charts being substantially juxtaposed, i.e., separated, or adjacent, or not separated, practically with the main lobes juxtaposed or overlapping each other substantially laterally, so as to illuminate together from the emission site where the emission system is arranged, the whole reception area monitored by an antenna reception system according to this invention. The emission radiation charts are distinct both in azimuth and zenith and have main radiation lobes being secant to the monitored reception area.

The basic signals could be digital or analog and should have specific orthogonality properties for improving determining the radar cells in the reception system. To this end, the emission antennas could emit the basic signals simultaneously and periodically, or successively and cyclically in the intervals separating them in time two by two. In the reception system, the basic signals, as reference signals, are respectively associated with respective mathematical operators, that could be, for example, correlations.

According to a first orthogonality property, the basic signals are orthogonal two by two. This means that when the reception system receives all or part of the basic signals to which a mathematical operator is applied, being associated with a respective basic signal selected as the reference signal, the result of the application is independent from the presence or the absence of all or part of the received basic signals other than the reference signal.

According to a second orthogonality property, each basic signal is orthogonal to itself, being offset in time. This means that when the reception system receives a replica of a basic signal to which the mathematical operator is applied, the replica being associated with the respective basic signal selected as the reference signal but being offset in time by a non-zero value with respect to the reference signal, the result of the application is zero for any non-zero offset in time.

Such two orthogonality properties are used for discriminating the basic signals in the means for forming reception charts in the reception system. To this end, the reception system could comprise means for weighting the signals captured by the reception antennas, the signal captured by a reception antenna being weighted so as to produce as many weighted signals as reception radiation charts, and means for discriminating in basic signal and bistatic distance in the set of the weighted signals, on the one hand, cells having a constant bistatic distance, on the other hand, for a given bistatic distande, cells associated with one of the basic signals able to be discriminated by their orthogonality properties.

The overall signal emitted by all the emission antennas and distributed in the space is defined by laminated emission radiation charts corresponding respectively to basic signals illuminating each the space. A laminated chart is so-called associated with the respective basic signal, the radiation of which is defined by the laminated chart.

From the reception signal where the reception system is located, there occurs a lacunar paving of the space defined by radar cells and created by the laminated radiation charts associated with the basic signals to be used and by bistatic propagation times between the emission site and the reception site. For a given bistatic propagation time, or for a given bistatic distance, between the emission site and the reception site in a bistatic radar system, the paving corresponds to propagation radar cells located on a half-ellipsoid on which the given bistatic propagation time being equal to the sum of the propagation time between the emission site and a radar cell and of the propagation time between the radar cell and the reception site is constant. In the reception system, radar cells are distinct one from the other, with respect to the substantially separated laminated emission charts, applying the first orthogonality property, and at a constant bistatic propagation time on a half-ellipsoid applying the second orthogonality property. The radar cells, which, for a given basic signal, selected as the reference signal and for a given bistatic propagation time, cannot be distinguished, make up Siamese radar cells associated with the given reference signal and with the given bistatic propagation time and make up in the monitored reception area a strongly lacunar paving of the geometric space on a part of the half-ellipsoid associated with the given bistatic propagation time.

The reception antenna system separates Siamese radar cells being associated with a given basic signal and a given bistatic propagation time and being distributed on a strongly lacunar paving, by means of different reception radiation charts within the monitored reception area. The angle distance between two Siamese radar cells associated with the given basic signal and the given bistatic propagation time and seen from the reception site is significant. The Siamese radar cells associated with the given basic signal and the given bistatic propagation time make up a discrete set in the monitored reception area according to azimuth and zenith directions under which the Siamese radar cells of such an area are seen from the reception site. Such azimuth and zenith directions locate Siamese radar cells associated with the given basic signal and the given bistatic propagation time in the reception system. The reception antenna system simultaneously forms P reception radiation charts, each reception radiation chart having or not at least one main radiation lobe contained in the reception area.

The reception radiation charts can be laminated like the emission charts. Thus, according to this invention, radiation charts comprising each main radiation lobes alternating with secondary radiation lobes could be formed by one of the pluralities of emission antennas and reception antennas, or even by both pluralities of antennas, the main radiation lobes associated with basic signals being substantially juxtaposed in the predetermined plane.

If M is the number of Siamese radar cells contained in the monitored reception area and located at the intersection of angular sectors covered by the main radiation lobes of the emission radiation chart associated with the given basic signal and a half-ellipsoid defined by the given propagation time between the emission system and a radar cell and a propagation time between the cell and the reception system, the number P of reception radiation charts formed by the reception antenna system is at least equal to M, i.e., is equal to or higher than M.

The signal that can be sent back by each cell is determined using the orthogonality properties allowing, via the mathematical operator associated with the given basic signal, to first discriminate, by the first orthogonality property, the cells associated with basic signals different from the given basic signal selected as the reference signal, then to separate by the second orthogonality property, the cells associated with the given basic signal and having a given bistatic propagation time from the cells associated with the given basic signal and having bistatic propagation times different from the given bistatic propagation time. The radar cells, referred to as Siamese cells, associated with the given basic signal and having the same given bistatic propagation time are separated by polling the reception area by reception charts being different from the reception antenna system, the number thereof being either equal to or higher than the number of radar cells in the reception area.

The space covered by each basic signal is explored by the reception antenna system successively varying all the bistatic propagation times so as to cover all the space illuminated by the basic signal at the intersection with the reception area.

The full exploration of the monitored reception area is obtained repeating the above mentioned operations for all the basic signals to be used.

Finally, this invention relates to computer programs able to be implemented respectively in an emission system comprising several emission antennas for emitting basic signals having orthogonality properties and in a reception system comprising several reception antennas for receiving the basic signals. Said programmes are characterized in that they comprise instructions which, when the programs are executed in the emission system and the reception system, implement the emission and the reception method according to this invention.

BRIEF DESCRIPTION OF THE DRAWINGS

Other characteristics and advantages of the present invention will become more evident reading the following description of several embodiments of this invention given as non limitative examples, with reference to the corresponding appended drawings in which.

DETAILED DESCRIPTION

Figure 1:
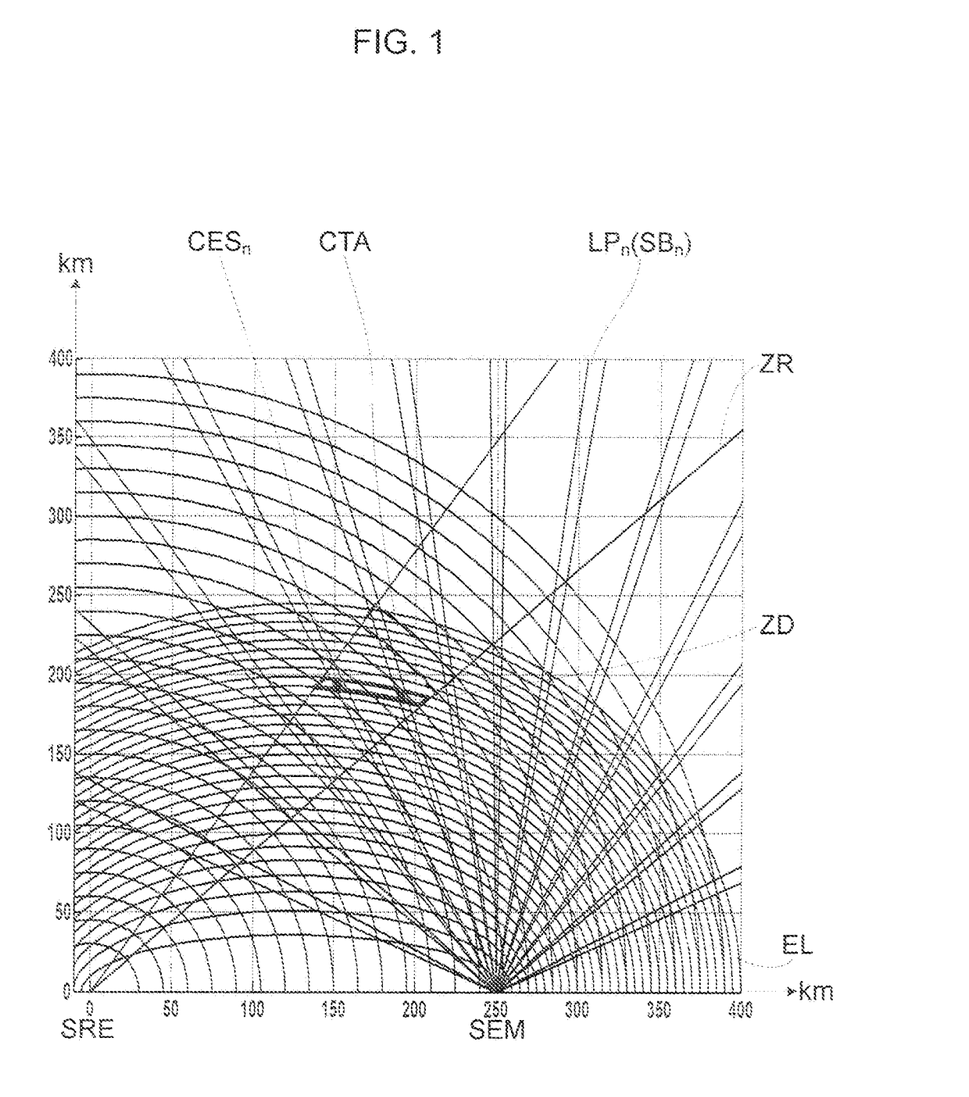
FIG. 1 schematically shows in an horizontal predetermined plane, a laminated radiation chart and a reception area in an angular sector for a bistatic radar system according to the invention.
Figure 2:
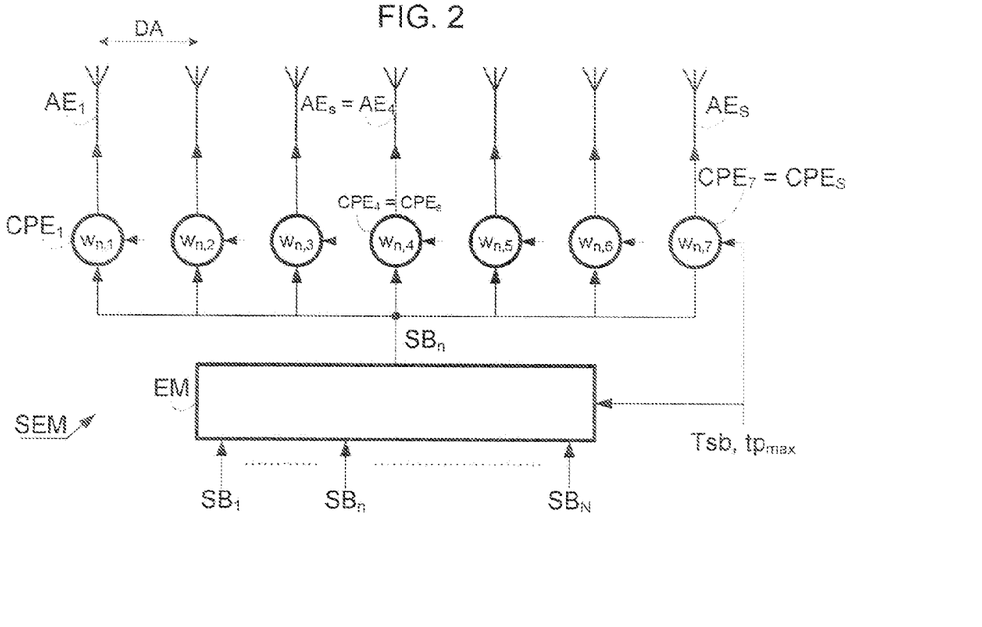
FIG. 2 is a schematic block-diagram of an antenna emission system according to this invention.
Figure 5:
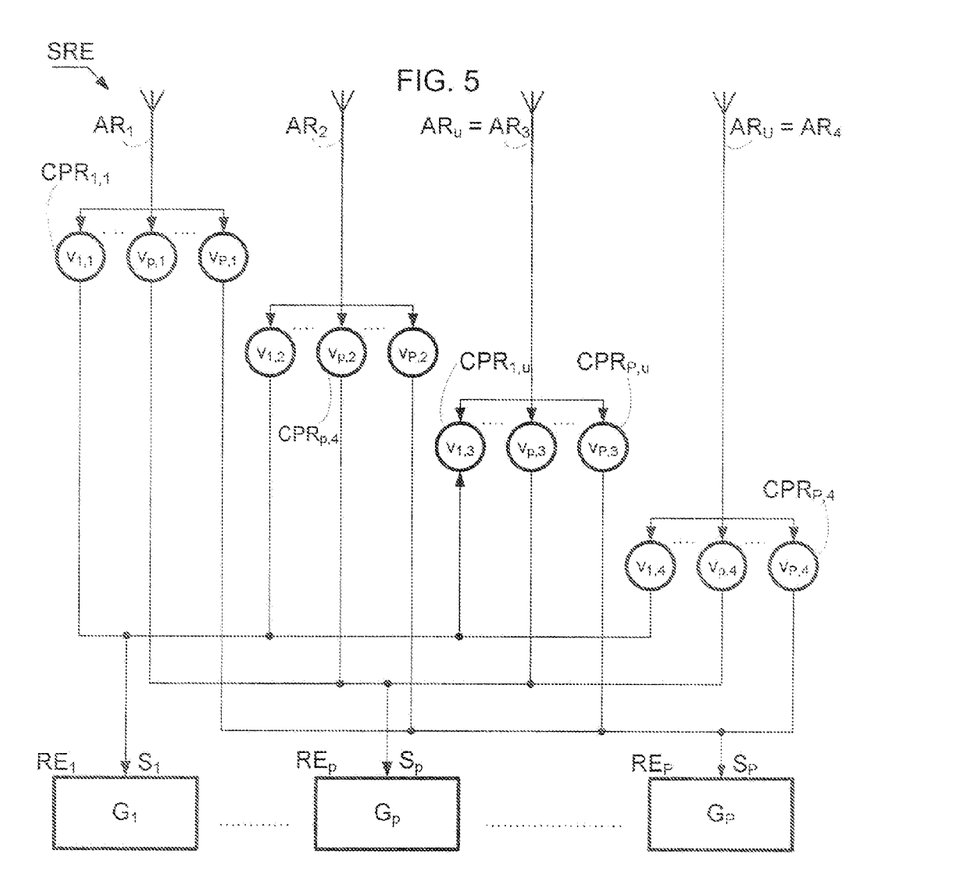
FIG. 5 is a schematic block-diagram of a reception system according to this invention.

With reference to FIGS. 1, 2 and 5, a SEM-SRE bistatic radar system, for instance, a HFSWR surface wave radar system, for instance for detecting targets by surface wave beyond the horizon, comprises a SEM emission system with several emission antennas AE and a SRE reception system with several reception antennas AR. The emission system is located on an emission site located, for instance, at D=250 km from the reception site where the reception system is located.

The SEM emission system produces at least one radio-electric signal defined by a laminated emission radiation chart associated with a $SB_n$ basic signal, when the latter is applied simultaneously under predetermined conditions, to the emission antennas AE, as will be explained further later on. The laminated emission radiation chart associated with the basic signal $SB_n$ is defined essentially by the main radiation lobes $LP_n$ being only shown in FIG. 1. However, the emission system SEM produces the main radiation lobes $LP_1$ to $LP_N$ of N laminated emission radiation charts associated respectively with basic signals $SB_1$ to $SB_N$ having orthogonality properties therebetween, with $1 \leq n \leq N$. The main lobes $LP_1$ to $LP_N$ occur as conical angular sectors having an angle at the predetermined apex in a predetermined radiation plane, for example horizontal passing through the site of the emission system SEM. FIG. 1 is located in a radiation horizontal plane crossing both the emission and the reception sites.

The emission system SEM of the invention producing laminated radiation charts can have an antenna structure belonging to the known class of antenna networks with ambiguous radiation charts, also so-called ambiguous networks. For example, an ambiguous network is got from a linear network of S emission antennas $AE_1$ to $AE_S$, with $2 \leq S$, wherein the antennas are separated from each other by a distance DA higher than $\lambda/2$, where $\lambda$ is the wavelength of a carrier modulated by the basic signals being emitted.

In FIG. 2 showing a first embodiment of the emission system SEM schematically functional blocks only are shown, ensuring useful functions for understanding this invention et having a link with the latter. Such functional blocks can correspond to dedicated or programmable hardware modules and/or to software modules implemented in at least one microprocessor.

The emission system SEM comprises S=7 antennas $AE_1$ to $AE_S=AE_7$ evenly spaced by DA=12.5 $\lambda$ for example. The emission system SEM further comprises emitting stages EM and weighting circuitry $CPE_1$ to $CPE_S$ interconnected respectively between the outlet of a power distributor in the emitting stages EM and inlets of antennas $AE_1$ to $AE_S$. A weighting circuit $CPE_S$, with $1 \leq s \leq S$, weights the amplitude and/or the phase of the basic signals $SB_1, \ldots SB_n, \ldots SB_N$ distributed respectively by the emitting stages EM with respective complex weighting coefficients $w_{1,s}, \ldots w_{n,s}, \ldots w_{N,s}$. The basic signal $SB_n$ distributed at the antennas $AE_1$ to $AE_S=AE_7$ is weighted respectively by complex weighting coefficients $w_{n,1}$ to $w_{n,s}=w_{n,7}$ in the weighting circuits $CPE_1$ to $CPE_S$ so that the antennas $AE_1$ to $AE_S$ emit a radio-electric signal characterized by a laminated radiation chart according to this invention and associated with the basic signal $SB_n$. This ensures a sufficiently significant protection on the secondary lobes of the charts and allows the orientation of the main lobes $LP_n$ associated with the basic signal $SB_n$. The larger the distance DA between the antennas, the more the number of main lobes of the laminated radiation charts increases. The larger the number of antennas, the more the number N of laminated emission radiation charts increases.

In this first embodiment, the basic signals are made up by families of orthogonal basic signals with a perfect or nearly perfect correlation being emitted by the emission system SEM simultaneously by the addition of basic signals or simultaneously by intertwining the basic signals.

Figure 3:
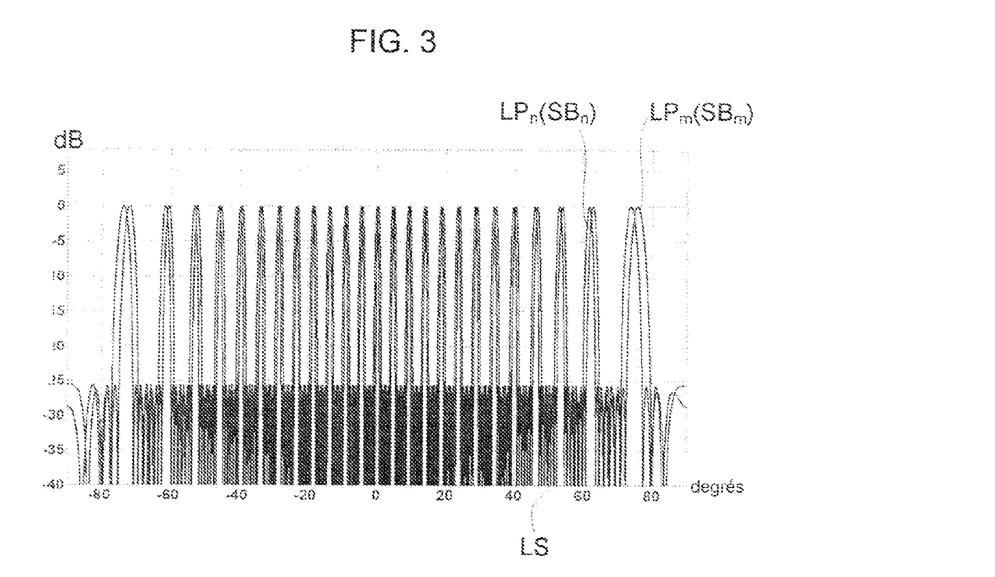
FIG. 3 is a laminated emission radiation chart produced by the emission system in FIG. 2.

On FIG. 3, two laminated radiation charts with main lobes $LP_n$ and $LP_m$ are juxtaposed, respectively associated with two distinct basic signals $SB_n$ and $SB_m$ to which complex weighting coefficients $w_{n,1}$ to $w_{n,S}$ and $w_{m,1}$ to $w_{m,S}$ have been applied by the weighting circuitry $CPE_1$ to $CPE_S$. The protection on the secondary lobes LS is of 26 dB. The chart with the main lobes $LP_n$ is oriented so as to locate a main lobe according to the direction 0 degree. The other chart with main lobes $LP_m$ is oriented so as to locate a main lobe according to the direction 1,2 degrees.

Those skilled in the art will understand that such lacunar radiation charts could be achieved by other emission systems having the antennas with other linear, surface or volume, even or uneven distributions. For example, the emission system could comprise an antenna network according to an uneven structure such as a fractal structure according to article "THEORIE FRACTALE DES GRANDS RESEAUX D'ANTENNES LACUNAIRES" C. GOUTELARD, AGARD Conference Proceedings 528, Radiolocation Techniques, Londres, $1^{er}$ au 5 juin 1992.

The antenna reception system SRE monitors one or more reception areas. In FIG. 1, it is assumed that the reception system only monitors one single conical reception area ZR being secant to at least one of the main radiation lobes of the laminated emission radiation chart associated with each basic signal $SB_n$. In practice, the reception area ZR is secant to several main radiation lobes associated with each basic signal.

FIG. 1 also shows partially with thin lines the elliptic parallel tracks of half-ellipsoids EL having as foci the emission system SEM and the reception system SRE. Each half-ellipsoid EL is defined by a surface on which any radar cell CE receives a radio-electric signal from the emission system SEM and is likely to broadcast it to the reception system SRE for a respective given bistatic propagation time tp, corresponding to a bistatic distance. The given bistatic propagation time tp equal to the sum of the propagation time between the emission system SEM and the radar cell CE and of the propagation time between the radar cell CE and the reception system SRE is constant for any radar cell on the surface of the ellipsoid EL.

The half-ellipsoids become half-spheres when the radar system SEM-SRE is monostatic, i.e., the emission and the reception systems are located on the same site, or half-ellipsoids nearly as half-spheres when the emission and the reception systems are close so that the distance separating them remains small with respect to the distances from the cells contained in the monitored reception area.

Figure 4:
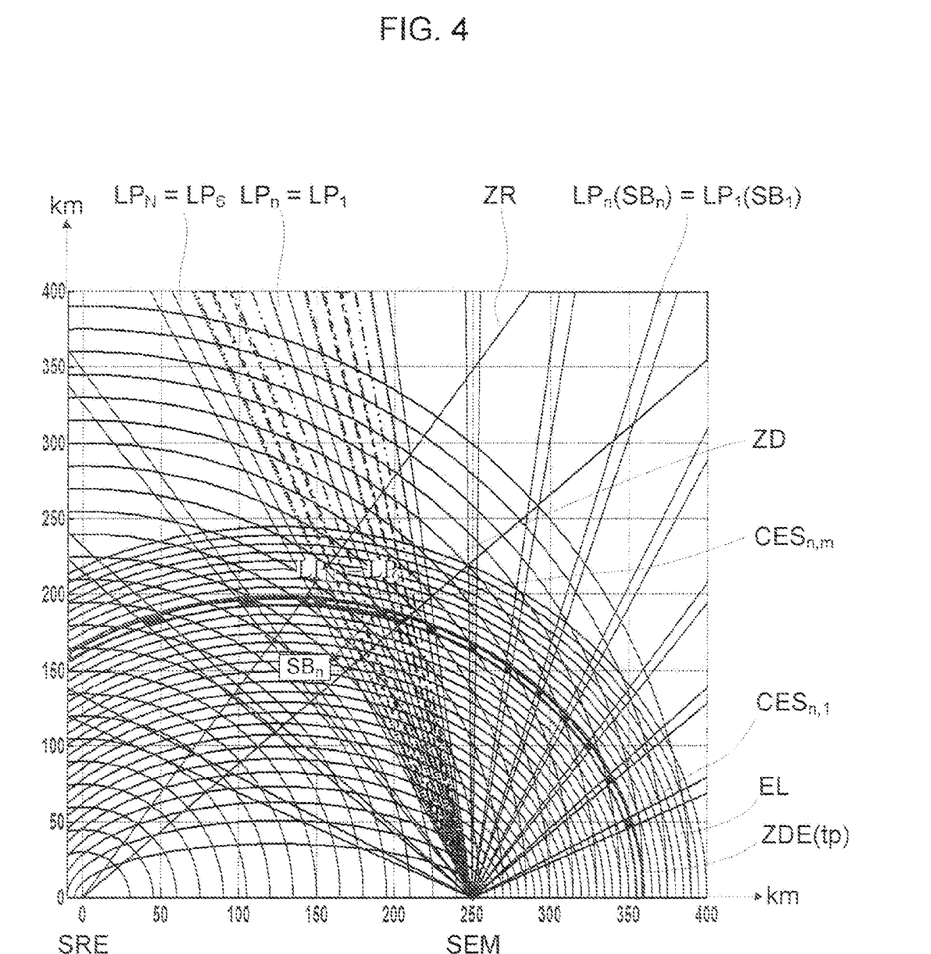
FIG. 4 is similar to FIG. 1, but with six laminated emission radiation charts being juxtaposed, only two main lobes of each radiation chart being shown.

Extended distance resolution areas ZDE, one of them being illustrated in FIG. 4 are defined between the half-ellipsoids EL so that the difference in bistatic propagation times is equal to the time resolution, for example, 1.5 km, of the radar. The intersection of an extended distance resolution area ZDE and of the reception area ZR determines a monitored distance resolution area ZD corresponding to a respective bistatic propagation time tp and also to a selected time resolution.

The intersections of an ellipsoid extended distance resolution area ZDE and of the main radiation lobes $LP_n$ define Siamese radar cells $CES_n$ associated with the basic signal $SB_n$ and with the bistatic propagation time tp defining the area ZDE, as shown in FIG. 4. The Siamese radar cells $CES_n$ associated with the basic signal $SB_n$ and the bistatic propagation time tp and located in the reception area ZR are geographical areas being common to the distance resolution area ZD, to the main lobes $LP_n$ of the laminated chart associated with the basic signal $SB_n$ and to the reception area ZR of the radiation chart of the antenna reception system SRE, as shown in FIG. 1.

The radar system of this invention delimits the Siamese radar cells $CES_n$ particularly through the space delimitation brought by the main lobes $LP_n$ of the laminated emission chart associated with the basic signal $SB_n$ in the antenna emission system SEM, of the reception area ZR of the antenna reception system SRE and through the orthogonality of the basic signals provided in the emission system.

Referring to FIG. 5 illustrating an embodiment of the reception system SRE, it schematically shows only functional blocks filling functions useful for understanding this invention and related to the latter. Such functional blocks could correspond to dedicated or programmable hardware modules and/or to software modules implemented in at least one microprocessor.

The reception system SRE comprises several reception antennas, for example U=4 antennas $AR_1$ to $AR_4$ and P receiving stages $RE_1$ to $RE_P$ associated respectively with P reception antenna charts so as to discriminate Siamese cells on a half-ellipsoid EL relating to each laminated emission chart and thus with each basic signal $SB_n$. In the reception, system SRE, each reception antenna $AR_u$, with $1 \leq u \leq U$, distributes the signal it receives to P receiving stages $RE_1$ to $RE_P$ respectively through weighting circuitry $CPR_{1,u}$ to $CPR_{P,u}$.

Figure 6:
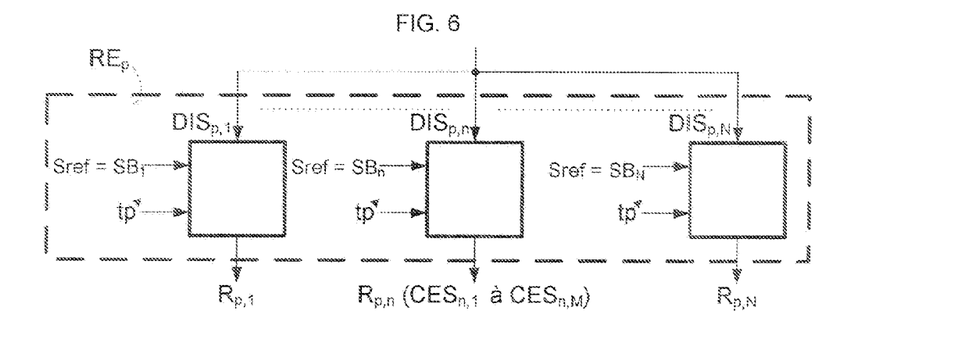
FIG. 6 is a schematic block-diagram of a discriminator receiving stage in the reception system.

The U weighting circuitry $CPR_{p,1}$ to $CPR_{p,U}$ connected to a receiving stage $RE_p$, with $1 \leq p \leq P$, weight the amplitude and/or the phase of the signals captured by the antennas $AR_1$ to $AR_U$ respectively by complex weighting coefficients $v_{p,1}$ to $v_{p,U}$ defining the angular orientation of a respective reception chart. The receiving stage $RE_p$ is associated with a case of angular positioning of radar cells covered by at least one main lobe of the respective reception chart. To this end, as shown in FIG. 6, the receiving stage $RE_p$ comprises N parallel discriminators $DIS_{p,1}$ to $DIS_{p,N}$ for discriminating into basic signal and bistatic propagation time in the set of the weighted signals received essentially in a respective reception area. Each discriminator $DIS_{p,n}$ of the receiving stage $RE_p$ is associated with a basic signal $SB_n$ as a reference signal Sref for discriminating in the jumble of weighted signals received according to the reception area, the radar cells on the one hand having a constant bistatic propagation time and thus, a constant bistatic distance, on the other hand, for a given bistatic propagation time, the Siamese radar cells associated with the basic signal $SB_n$ among the basic signals $SB_1$ to $SB_N$ able to be discriminated through their orthogonality properties. The discriminators $DIS_{p,1}$ to $DIS_{p,N}$ thus distinguish the radar cells associated with the basic signals $SB_1$ to $SB_N$ according to a respective reception area and for different bistatic propagation times.

Each one of the discriminators $DIS_{1,n}$ to $DIS_{P,n}$ in the reception system SRE selects the main lobes $LP_n$ of the laminated chart specific to the basic signal $SB_n$ by means of the first and the second orthogonality properties of the basic signals $SB_1$ to $SB_N$. The reception system knows a priori the basic signals $SB_1$ to $SB_N$, for example as predetermined numeral sequences, which, as reference signals are periodically read out in the memory of the reception system and respectively applied to the discriminators. Through implementing the first orthogonality property relating to the orthogonality of the basic signals two by two, each one of the discriminators $DIS_{1,n}$ to $DIS_{P,n}$ operates, for example, as a correlator or a convolution device selects the basic signal $SB_n$ in the mixed signal received by the respective receiving stage $RE_1$ to $RE_P$, independently from the fact that the mixed signal contains all or part of the other received basic signals $SB_1$ to $SE_{n-1}$ and $SB_{n+1}$ to $SE_N$. The discriminators $DIS_{1,n}$ to $DIS_{P,n}$ thus select the radar cells at the intersection of the main emission radiation lobes $LP_n$ and of the reception area ZR covered by the reception chart.

In the case of a prior art detection with a monostatic radar system located at the reception site, the reception cell is limited by the main lobe of the reception network and the time resolution. In FIG. 1, the reception area ZR has been selected in proximity to the main lobe of the reception chart used according to the prior art. The time resolution according to the prior art is lower than achieved in this invention as the used known signals do not impart the detection performance that is achieved with the basic signals used in this invention. The main lobes of the laminated emission charts according to this invention conjugated to the basic signals used in the invention help to reduce the time resolution by a factor Kr of the order of 3 to 5 and by the same factor the dimension of the radar cells obtained with this invention. A radar cell obtained according to the prior art is shown in FIG. 1 at the intersection of the space between the reception area ZR and two half-circles centred on the receiving system SRE and distant by a distance resolution increment of 15 km for example.

FIG. 4. partially shows an exemplary paving of radar cells obtained according to this invention with the assumptions taken for FIG. 1, through the use of all the basic signals and the associated processing in the radar system SEM-SRE. The partial paving is at the intersection of the reception area ZR, of an extended ellipsoid distance resolution area ZDE for a given bistatic propagation time tp and of the main lobes $LP_1$ to $LP_N=LP_6$ being juxtaposed and intertwined. In order to avoid overloading FIG. 4, the main lobes $LP_1$ to $LP_N$ are shown on two angular periods of N=6 laminated charts attributed to different basic signals $SB_1$ to $SB_N=SB_6$. The main lobes are, as has been previously indicated, able to be discriminated by the orthogonality of the basic signals in the discriminators $DIS_{1,1}$ to $DIS_{P,N}$.

The different Siamese radar cells $CES_1$ to $CES_N$ associated with a bistatic propagation time tp and to all the basic signals $SB_1$ to $SB_N$ pave the distance resolution area ZD. The Siamese radar cells respectively associated with couples $(SB_1, tp)$ to $(SB_N, tp)$ can be separated as long as the basic signals with which they are associated are different.

FIG. 4 also shows the extended distance resolution area ZDE corresponding to a given bistatic propagation time tp and a selected resolution distance being extended to the space able to be monitored. The Siamese radar cells $CES_n=CES_1$ associated with the couple $(SB_n, tp)$ are located at the intersection of the extended distance resolution area ZDE and the main lobes $LP_n$ of the laminated emission chart associated with the basic signal $SB_n$.

The $m_{th}$ Siamese radar cell $CES_{n,m}$ associated with the couple $(SB_n, tp)$ and covered by the reception area ZR is able to broadcast toward the reception system SRE a signal:

$$Sr_{n,m} = \alpha_{nm} \times SER_{n,m} \times SB_n(tp),$$

$\alpha_{nm}$ being a propagation attenuation, and $SER_{n,m}$ the radar equivalent surface of the Siamese radar cell $CES_{n,m}$ associated with the couple $(SB_n, tp)$. Such a couple defines the replica $SB_n(tp)$ of the signal $SB_n$ temporally offset from the bistatic propagation time tp.

The antenna reception System SRE forms, via the antennas $AR_1$ to $AR_U$ and the weighting circuitry $CP_{1,1}$ to $RE_{P,U}$, P reception radiation charts with respective main lobes $LP_1$ to $LP_P$. For a reception area ZR containing M Siamese radar cells associated with the couple $(SB_n, tp)$, for example, two cells $CES_n$ in FIG. 4, with M≤P, each signal $S_p$ captured by the reception antenna networks $AR_1$ to $AR_U$ for the $p^{th}$ reception chart processed by the receiving stage $RE_p$, with 1≤p≤P, is expressed as follows:

$$S_p = \sum_{m \in M} G_p(\theta r_{n,m}, \varphi r_{n,m}) \times Sr_{n,m} + T(SB_e, tp_e),$$

where $(\theta r_{n,m}, \varphi r_{n,m})$ is the angular direction in azimuth $\theta r_{n,m}$ and zenith $\varphi r_{n,m}$ of the $m^{th}$ Siamese radar cell $CES_{n,m}$ associated with the couple $(SB_n, tp)$. $G_p(\theta r_{nm}, \varphi r_{nm})$ is the gain of the $p^{th}$ reception radiation chart according to the azimuth and the zenith direction $(\theta r_{n,m}, \varphi r_{n,m})$. The signal $T(SB_e, tp_e)$ represents the sum of all the signals received by the antenna reception system and able to be retro-broadcast by radar cells illuminated by the emission charts associated with the other basic signals $SB_1$ to $SB_{n-1}$ and $SB_{n+1}$ to $SB_N$ than the signal $SB_n$ and by the radar cells illuminated by the chart associated with the basic signal $SB_n$ and located in correspondence to bistatic propagation times $tp_e$ being different from the given propagation time tp.

The discriminators $DIS_{1,n}$ to $DIS_{P,n}$ using the basic signal $SB_n$ as the reference signal eliminate as a result of the first orthogonality property previously being defined the radar cells helping to form the signal $T(SB_e, tp_e)$ associated with one or more other basic signals than the signal $SB_n$. For the given bistatic propagation time tp, the discriminators $DIS_{1,n}$ to $DIS_{P,n}$ also eliminate the radar cells helping to form the signal $T(SB_e, tp_e)$ and associated with the basic signal $SB_n$ and to other bistatic propagation times $tp_e$ than the given bistatic propagation time tp, applying the second previously defined orthogonality property, for example relying on an autocorrelation, wherein each basic signal is orthogonal to itself being offset in time.

Both orthogonality properties can be achieved with families of encoded symbol sequences making up periodically and respectively the basic signals $SB_1$ to $SB_N$, such that the cross-correlation function between the sequences is strictly nil, whatever the time offset between the sequences and the perfect or nearly perfect character of the cross-correlation and of the autocorrelation functions applied to the basic signals received in the discriminators. The sequences are emitted cyclically modulating a common carrier in the emission system SEM. A correlation function of a sequence is referred to as nearly perfect if the correlation function is not nil for any point that differs from the central peak with a nil offset of the sequence and a few evenly spaced points on the correlation function of a predetermined number of symbols. As an example, the sequences GQ (Goutelard Q-ary sequences) built according to the article "LES SEQUENCES GQ SEQUENCES Q-AIRE ORTHOGONALES A CORRELATION PARFAITE", C. GOUTELARD, AGARD CONFERENCE PROCEEDINGS 574, SPP Symposium, "Digital Communications Systems: Propagation Effects, Technical Solutions, Systems Design", Athènes, Grèce, 18 au 21 septembre 1995, CP-574, meet the first and the second orthogonality properties.

The discriminators $DIS_{1,n}$ to $DIS_{P,n}$ associated with the basic signal $SB_n$ perform, for example, a correlation, or an equivalent operation such as, for example, a convolution. The discriminator $DIS_{P,n}$ delivers a standardized signal $R_{P,n}$ of the type:

$$R_{P,n} = \sum_{m \in M} Kop \times G_p(\theta r_{n,m}, \varphi r_{n,m}) \times \alpha_{n,m} \times SER_{n,m},$$

Kop being a transformation coefficient for the mathematical operator in the discriminators $DIS_{1,n}$ to $DIS_{P,n}$ between the signal $S_p$ and the signal $R_p$.

For the given bistatic propagation time tp, the discriminators $DIS_{1,n}$ to $DIS_{P,n}$ supply a system of P equations corresponding to the P signals $R_{1,n}$ to $R_{P,n}$ being measured with the P reception radiation charts, having M unknown factors $\alpha_{n,1} \times SER_{n,1}$ to $\alpha_{n,M} \times SER_{n,M}$ corresponding to the Siamese radar cells $CES_{n,1}$ to $CES_{n,M}$ associated with the couple $(SB_n, tp)$ and included in the monitored reception area, the number P being equal to or higher than M. If P=M, the equation system is determined and makes up a Cramer's system. If P>M, the equation system is over-determined and can be operated for increasing the accuracy of calculations.

For each one of the bistatic propagation times and thus, for each one of the bistatic distances, the discriminators $DIS_{1,n}$ to $DIS_{P,n}$ supply a system of P equations corresponding to P signals $R_{1,n}$ to $R_{P,n}$ measured with the P reception radiation charts, having as many unknown factors as Siamese radar cells being associated with the couple of the basic signal $SB_n$ and of the said each one of the bistatic propagation times and included in the monitored reception area. The number P is equal to or higher than the number of above mentioned Siamese radar cells.

More generally, all the signals $R_{1,1}$ to $R_{P,N}$ supplied by the discriminators $DIS_{1,1}$ to $DIS_{P,N}$ are used for determining all the basic signals sent back by the Siamese cells illuminated by the main lobes $LP_1$ to $LP_N$ of the emission charts and located in the reception area ZR.

According to various embodiments, the reception system can cover a more or less extended reception area ZR.

In the embodiment as illustrated in FIG. 1, the reception area ZR is limited to part of the area to be monitored and the exploration of the monitored reception area is made by the antenna reception system SRE by a set of Q reception areas completely paving the monitored area Q linear equation systems are to be solved.

In the embodiment as illustrated in FIG. 4, the reception area ZR is extended to all the monitored reception area. One single linear equation system (Q=1) is to be solved.

Figure 7:
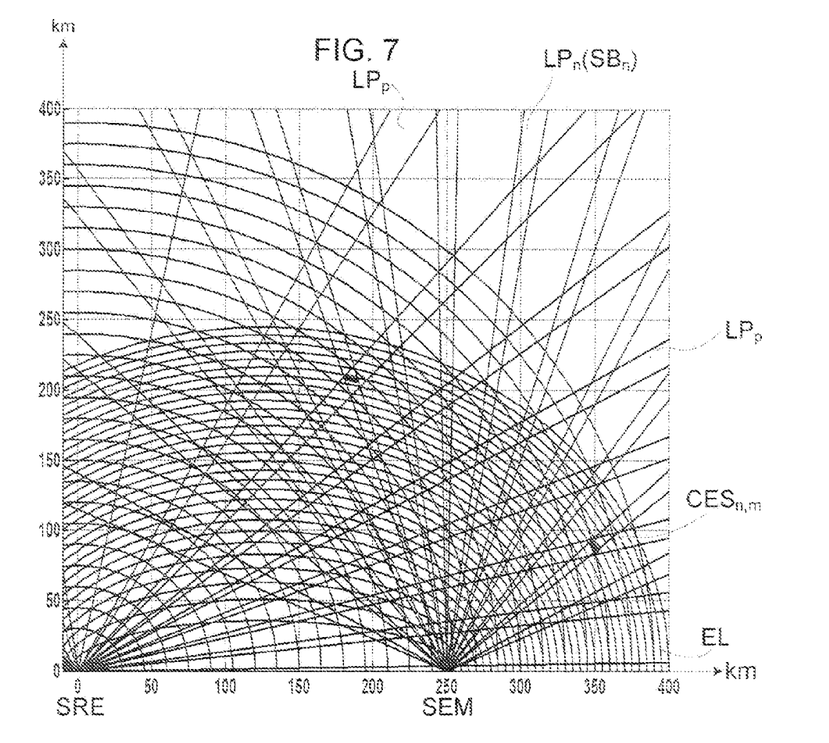
FIG. 7 is similar to FIG. 1, but with a laminated reception radiation chart.

In the embodiment illustrated in FIG. 7, the monitored reception area ZR is achieved with a set of laminated charts at the reception, the main lobes $LP_P$ of a single one of which, alternating with secondary radiation lobes, are shown. The antennas in the reception system could make up a lacunar network or a network producing ambiguous radiation charts. Main lobes of the laminated reception radiation charts are substantially juxtaposed so as to cover the monitored reception area, similarly to the juxtaposition of the main lobes of the laminated emission charts shown in FIG. 4. Such a solution increases the number Q of linear equation systems, but reduces the number of unknown factors of each equation system. The main lobes of each emission chart can be in any number or reduced to only one.

The dimensions of the antenna reception system SRE vary as a function of the solution being adopted.

In FIG. 1, there is shown a reception area ZR the dimension of which is typically that of a main reception lobe of a prior art reception system. FIG. 4 shows M=12 Siamese radar cells associated with the couple ($SB_n$=$SB_1$, tp) in the quadrant delimited by FIG. 4.

The dimensions of the reception area remain unchanged, but the size of the radar cells according to this invention is reduced with respect to the prior art, i.e. M×N=72 in FIG. 4. Such a reduction according to the invention could be as high as several hundreds.

This invention relies on basic signals that should have the first and the second above mentioned orthogonality properties. Any signal having such orthogonality properties can be used in this invention for forming a family of basic signals.

Figure 8:
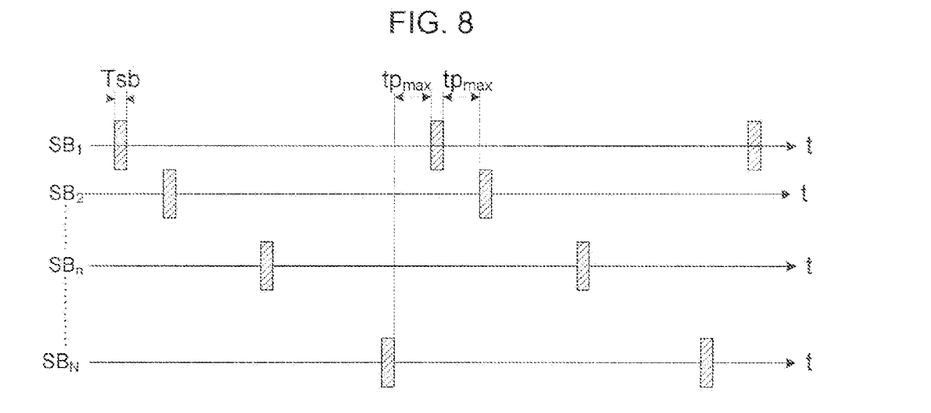
FIG. 8 is a time chart of cyclic emissions of basic signals in another embodiment of the emission system.

The time chart in FIG. 8 shows a second embodiment such that the emission system SEM emits basic signals having the first and the second orthogonality properties.

At the beginning of a cycle of N periods, the emission system emits a basic signal $SB_1$ of a duration Tsb followed with a nil signal, the duration of which is equal to or higher than the maximum bistatic propagation time $tp_{max}$ so as to cover the monitored reception area. Then, during the following period, the emission system emits a basic signal $SB_2$ followed by a duration being at least equal to $tp_{max}$, then the other signals being separated temporally two by two by at least $tp_{max}$ up to the last basic signal $SB_N$. Another cycle of successive emissions of basic signals then starts, similar to that previously described.

The double orthogonality condition is met.

The first orthogonality is met by the temporal separation of laminated emission charts that are associated with the signals $SB_1$ to $SB_N$ and only occur at different times, whatever the time. The reception system could only receive one single non nil basic signal at a time. In such a case, the signals $SB_1$ to $SB_N$ could be identical to a same signal showing the second orthogonality.

The second orthogonality is met if each non nil basic signal possesses such a property, i.e. if the replicas thereof can be separated over time. Such a property is met for a large number of sequences, but also for a single isolated pulse. The basic non nil signal $SB_1$ to $SB_N$ could be made up of a sequence or a string of identical or not identical sequences, or an isolated pulse or a string of isolated pulses.

In addition to a large reduction of a radar cell, this invention provides a significant improvement of the performance of any sensing, electromagnetic or acoustic system, being faced to the problem of detecting a target, the signature of which should be extracted from a signal containing a jumble dependent on the dimension of the radar cell of the sensing system. The invention further provides a significant gain with respect to the space discrimination of targets able to be present in the monitored reception area.

The invention finds numerous applications in all the electromagnetic sensing systems including radars, sonars, radio-localisation systems, systems for probing channels, medical radiography systems and industrial radiography systems.

The advantages being provided are particularly important in cases where it is impossible, whatever the reason, to impart to antenna systems, more particularly, to an antenna reception system being most often the bulkiest, dimensions that it should have for achieving resolutions obtained with this invention and that could only be achieved in the prior art after the significant increase, of a factor of about several tens, of the dimensions of the antenna reception system.

The invention as described herein relates to an emission and reception method and to emission and reception systems for emitting basic signals having orthogonality properties by antennas in the emission system and several reception antennas in the reception system for receiving basic signals. According to an implementation, the emission and reception method according to this invention is determined by the instructions of computer programs incorporated into emission and reception systems. The programs comprise program instructions that, when said programs are carried out in emission and reception systems, the operation of which is then controlled, more specifically, through carrying out programs, implement the emission and reception method according to this invention.

Consequently, the invention further applies on computer programs, more specifically computer programs recorded on or in one or more of computer readable recording media and any data processing device, adapted for implementing this invention. Such programs could use any programming language, and be in the form of a source code, an object code or a code intermediary between a source code and an object objet such as in a partially compiled form, or in any other form desired for implementing the method of this invention.

A recording medium could be any unit or device able to store programs.

The invention claimed is:

1. A method for remote sensing using:
an emission system comprising a plurality of emission antennas for emitting a plurality of signals, wherein:
each of the emitted signals results from modulation of a carrier signal by an encoded sequence,
the encoded sequence of each emitted signal is orthogonal to the encoded sequence of any other emitted signal,
the encoded sequence of each emitted signal is orthogonal to the encoded sequence of another instance of the emitted signal with a non-zero offset in time, and
each emission of a respective signal is made by the antennas with a preset signal strength distribution according to an emission radiation chart, the emission radiation chart including main radiation lobes indicating maximum signal strength alternating with secondary radiation lobes indicating minimum signal strength, and
a reception system comprising a plurality of reception antennas for receiving signals emitted by the plurality of emission antennas, wherein each reception of a respective signal is made by antennas in a reception area according to a reception radiation chart;
the method comprising:
emitting the plurality of signals by the emission antennas according to the emission radiation chart defining signal strength distribution of the signals, wherein the main radiation lobes of the emission radiation charts of the respective signals are arranged together in space one by one in a laminated pattern;
receiving signals by the reception antennas according to a reception radiation chart indicating a reception area and relationship between the reception area and the main radiation lobes;
detecting a number of radio cells which are:
contained in the reception area,
covered by the main radiation lobes of one of the emission radiation charts, and
located at a given bistatic distance from the emission system and the reception system;
wherein the detecting of the number of the radio cells comprises:
weighting the signals received by the reception antennas; and
on the basis of the received signals and on a bistatic distance of the set of weighted signals, identifying cells having a constant bistatic distance and, for a given distance, cells associated with one of the received signals which can be distinguished one from another at least by their encoded sequences being orthogonal to each other.

2. The method according to claim 1, further comprising successively and cyclically emitting the plurality of signals.

3. The method according to claim 1, wherein each emission radiation chart has a plurality of main lobes corresponding to surface density maximums of radiated energy alternating with secondary radiation lobes corresponding to surface density minimums of radiated energy.

4. The method according to claim 1, wherein at least one of the amplitude and phase of the emitted signal is adjusted according to a weighting coefficient.

5. A remote sensing system for remote sensing, comprising:
an emission system having a plurality of emission antennas for emitting a plurality of signals, wherein:
each of the emitted signals results from modulation of a carrier signal by an encoded sequence,
the encoded sequence of each emitted signal is orthogonal to the encoded sequence of any other emitted signal, and
the encoded sequence of each emitted signal is orthogonal to the encoded sequence of another instance of the emitted signal with a non-zero offset in time;
wherein the emission system is configured to emit the plurality of signals by the emission antennas with a preset signal strength distribution according to an emission radiation chart, wherein the emission radiation chart includes main radiation lobes indicating maximum signal strength alternating with secondary radiation lobes indicating minimum signal strength; and the main radiation lobes of the emission radiation charts of the respective signals are arranged together in space one by one in a laminated pattern; and
a reception system having a plurality of reception antennas for receiving the signals emitted by the plurality of emission antennas, wherein the reception system is configured to:
receive the emitted signals by the reception antennas according to a reception radiation chart indicating at least one reception area and relationship between the reception area and the main radiation lobes;
detect a number of radio cells which are:
contained in the reception area,
covered by the main radiation lobes of one of the emission radiation charts, and
located at a given bistatic distance from the emission system and the reception system;
wherein the detecting of the number of the radio cells comprises:
weighting the signals received by the reception antennas; and
on the basis of the received signals and on a bistatic distance of the set of weighted signals, identifying radio cells having a constant bistatic distance and, for a given bistatic distance, radio cells associated with one of the received signals which can be distinguished one from another at least by their encoded sequences being orthogonal to each other.

6. The remote sensing system of claim 5, wherein each emission radiation chart has a plurality of main lobes corresponding to surface density maximums of radiated energy alternating with secondary radiation lobes corresponding to surface density minimums of radiated energy.

7. The remote sensing system of claim 5, wherein at least one of an amplitude and phase of the emitted signal is adjusted according to a weighting coefficient.

8. The remote sensing system of claim 5, wherein the plurality of signals are emitted successively and cyclically.

9. A non-transitory computer-readable medium having instructions stored thereon, which, when executed by at least one processor, cause the at least one processor to cause a remote sensing system including an emission system and a reception system to perform the steps of:
emitting a plurality of signals by a plurality of emission antennas in the emission system with a preset signal strength distribution according to an emission radiation chart, wherein:
each of the emitted signals results from modulation of a carrier signal by an encoded sequence,
the encoded sequence of each emitted signal is orthogonal to the encoded sequence of any other emitted signal, the encoded sequence of each emitted signal is orthogonal to the encoded sequence of another instance of the emitted signal with a non-zero offset in time, and the emission radiation chart includes main radiation lobes indicating maximum signal strength alternating with secondary radiation lobes indicating minimum signal strength; and the main radiation lobes of the emission radiation charts of the respective signals are arranged together in space one by one in a laminated pattern; and receiving the emitted signals by a plurality of reception antennas in the reception system according to a reception radiation chart indicating at least one reception area and relationship between the reception area and the main radiation lobes;

detecting a number of radio cells which are:
    contained in the reception area,
    covered by the main radiation lobes of one of the emission radiation charts, and
    located at a given bistatic distance from the emission system and the reception system;

wherein the detecting of the number of the radio cells comprises:

weighting the signals received by the reception antennas; and on the basis of the received signals and on a bistatic distance of the set of weighted signals, identifying radio cells having a constant bistatic distance and, for a given bistatic distance, radio cells associated with one of the received signals which can be distinguished one from another at least by their encoded sequences being orthogonal to each other.

10. The non-transitory computer-readable medium according to claim 9, wherein at least one of the amplitude and phase of the emitted signal is adjusted according to a weighting coefficient.

11. The non-transitory computer-readable medium according to claim 9, wherein each emission radiation chart has a plurality of main lobes corresponding to surface density maximums of radiated energy alternating with secondary radiation lobes corresponding to surface density minimums of radiated energy.

12. The non-transitory computer-readable medium according to claim 9, wherein the plurality of signals are emitted successively and cyclically.

\* \* \* \* \*